US011867374B2

(12) United States Patent
Walters et al.

(10) Patent No.: US 11,867,374 B2
(45) Date of Patent: Jan. 9, 2024

(54) HARDCOAT DIFFUSER FOR AUTOMOTIVE LIGHT ASSEMBLIES

(71) Applicant: Lacks Enterprises, Inc., Grand Rapids, MI (US)

(72) Inventors: Dave Walters, Shelbyville, MI (US); Aaron Johnson, Grand Rapids, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 0 days.

(21) Appl. No.: 17/867,728

(22) Filed: Jul. 19, 2022

(65) Prior Publication Data

US 2023/0012854 A1 Jan. 19, 2023

Related U.S. Application Data

(60) Provisional application No. 63/223,455, filed on Jul. 19, 2021.

(51) Int. Cl.
*F21S 41/275* (2018.01)
*F21S 41/143* (2018.01)

(52) U.S. Cl.
CPC ........... *F21S 41/275* (2018.01); *F21S 41/143* (2018.01)

(58) Field of Classification Search
CPC .............................. F21S 41/143; F21S 41/275
See application file for complete search history.

(56) References Cited

U.S. PATENT DOCUMENTS

| | | | | |
|---|---|---|---|---|
| 6,059,434 | A * | 5/2000 | Murakoshi | F21V 3/04 362/510 |
| 8,434,883 | B2 * | 5/2013 | Doan | F21V 3/049 362/256 |
| 2004/0005436 | A1 * | 1/2004 | Mori | G02B 1/11 428/141 |
| 2016/0326383 | A1 * | 11/2016 | Pokorny | C09D 7/62 |
| 2018/0182933 | A1 * | 6/2018 | Abe | F21K 9/90 |
| 2019/0093851 | A1 * | 3/2019 | Johnson | F21S 45/43 |
| 2019/0093858 | A1 * | 3/2019 | Wykoff, II | F21V 3/10 |
| 2020/0111845 | A1 * | 4/2020 | Shigemura | H10K 50/844 |
| 2021/0071837 | A1 * | 3/2021 | Owoc | F21V 31/005 |

* cited by examiner

*Primary Examiner* — Tracie Y Green
*Assistant Examiner* — Michael Chiang
(74) *Attorney, Agent, or Firm* — Dickinson Wright PLLC

(57) ABSTRACT

A light assembly includes a light source and a lens. The lens includes a hardcoat surface that protects the lens. The light source is positioned close to the lens, and a microtexture is defined in the hardcoat material to increase diffusion of the light to overcome the limitations of the close spacing between the lens and the light source. The hardcoat material and microtexture may be applied to both sides of the lens or one side of the lens. The light source may be a plurality of spaced apart LEDs. The microtexture may be applied to the entire surface of the lens or select regions of the lens. The microtexture is defined after the hardcoat is applied, and is defined via removal or disruption of hardcoat material. The microtexture may be defined in different ways to vary the appearance of the microtexture.

22 Claims, 2 Drawing Sheets

HARDCOAT DIFFUSER FOR AUTOMOTIVE LIGHT ASSEMBLIES

CROSS-REFERENCE TO RELATED APPLICATIONS

This application claims the benefit of previously filed U.S. Provisional Patent Application No. 63/223,455, filed Jul. 19, 2021, the entire content of which is hereby incorporated by reference in its entirety.

FIELD

The present disclosure relates to light assemblies. More particularly, the present disclosure relates to automotive light assemblies with lens diffusion.

BACKGROUND

There is an increasing demand for lighting fixtures in interior and exterior automotive applications to meet the requirements of new and more complicated designs. LED lights are typically used in these applications for a number of reasons, but primarily due to their compact size that can fit into increasingly smaller spaces.

One of the main problems that results from the small space constraint is the need to space and position the LED lights at an appropriate distance, such that the emitted light over the light fixture is relatively consistent in intensity, without dead spots, weak zones, and/or distinct areas of elevated light intensity. In tight packaging and small space situations it can therefore be difficult to create a fully or sufficiently diffused appearance.

Laws of physics determine the typical minimum spacing or distance between the light source(s) and the optical diffuser. The basic law states that the minimum distance between the light sources (or LEDs) and the lens optic is about 1.1× LED spacing (the space between each LED) in order to fully or sufficiently diffuse the light from the light sources. However, many applications do not allow for this minimum spacing or distance.

Adding additional LEDs to given space can reduce the LED spacing, thereby reducing the necessary minimum distance to the lens optic. However, this approach of adding LEDs to reduce LED spacing as a means of achieving full or sufficient diffusion over a smaller distance can be detrimental because this approach increases cost, creates additional heat, and consumes more power.

Another approach that is used to achieve light diffusion is to add or create a diffusive agent to the lens or optic. Lenses are typically molded from polycarbonate due to its optical transparency. In this approach, micro-diffusive regions can be added to the polycarbonate material of the molded lens to achieve an increased diffusion effect; however, polycarbonate surfaces are easily marred, which harms the appearance of the illumination.

Polycarbonate may be treated with a hardcoat to prevent or substantially limit marring and abrasion; however, a hardcoat coating applied over a diffusive microstructure or micro-diffusive region will level out and/or fill the micro-diffusive regions, thereby rendering the diffusion aspect of the lens and these regions ineffective.

In view of the above, improvements can be made to diffusive lens structures that are resistant to wear/marring while maintaining a sufficient diffusive effect.

SUMMARY

According to an aspect of the disclosure, a light assembly for an automotive vehicle is provided. The light assembly includes: a light source; a lens disposed adjacent the light source at a predetermined distance from the light source, wherein the lens includes an inner side facing the light source and an outer side facing away from the light source; a hardcoat layer applied to at least one of the inner surface and the outer surface; a micro-texture defined in at least a portion of the hardcoat layer; wherein the micro-texture increases diffusion of light provided by the light source.

In one aspect, the hardcoat layer has a first roughness, and wherein the micro-texture has a second roughness that is different than the first roughness.

In one aspect, the first roughness is smoother than the second roughness.

In one aspect, the hardcoat layer is disposed on the outer side of the lens, and the microtexture is defined in an exposed surface of the hardcoat layer facing away from the lens and the light source.

In one aspect, the microtexture is defined by removal or disruption of material of the hardcoat layer, wherein the hardcoat layer is applied to the lens prior to defining the microtexture.

In one aspect, a second hardcoat layer is disposed on the inner side of the lens, and a second microtexture is defined in an exposed surface of the second hardcoat layer facing away from the lens and toward the light source.

In one aspect, the microtexture is disposed across substantially an entire exposed surface of the hardcoat layer.

In one aspect, the microtexture is disposed across select regions of the hardcoat layer, with other select regions being free from the microtexture.

In one aspect, the hardcoat layer is made from a material that is harder than the material of the lens.

In one aspect, the hardcoat layer and microtexture are disposed on both the inner and outer sides of the lens, wherein the microtexture on the inner side has a different roughness than the microtexture on the outer side.

In one aspect, the microtextures on the inner side and the outer side are defined via different roughening processes.

In another aspect, a light assembly for an automotive vehicle includes: at least one LED; a lens disposed adjacent the at least one LED at a first distance from the light source, wherein the lens includes a first side facing away from the light source and a second side facing the light source; a hardcoat layer applied to at least a portion of the first side and/or the second side; a micro-texture defined in at least a portion of an exposed surface of the hardcoat layer; wherein the micro-texture increases diffusion of light provided by the at least one LED.

In one aspect, the at least one LED comprises a plurality of LEDs spaced apart from each other at a second distance.

In one aspect, the first distance between the lens and the at plurality of LEDs is less than 1.1 times the second distance.

In one aspect, the hardcoat layer is about 6-18 microns in thickness and the lens is about 2-5 mm in thickness.

In one aspect, the microtexture is disposed across the lens randomly or in a pre-defined pattern.

In another aspect, a method of treating a lens of a light assembly for a vehicle is provided. The method includes the steps of: providing a lens at a first distance from a light source; applying a hardcoat layer to at least one side of the lens; and roughening the hardcoat layer and defining a microtexture in an exposed surface of the hardcoat layer after the hardcoat layer has been applied to the lens.

In one aspect, the hardcoat layer and microtexture are applied to both inner and outer sides of the lens.

In one aspect, the microtexture is applied to select regions of the lens.

In one aspect, the microtexture is applied via removal or disruption of material of the hardcoat layer, wherein a first thickness of the hardcoat layer is applied and material is removed from the first thickness, thereby defining a second thickness of the hardcoat layer and the microtexture, wherein the second thickness falls within a predefined specification range.

In one aspect, the predefined specification range is 6-18 microns.

In one aspect, the first thickness of the hardcoat layer also falls within the predefined specification range.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION

Figure 1:
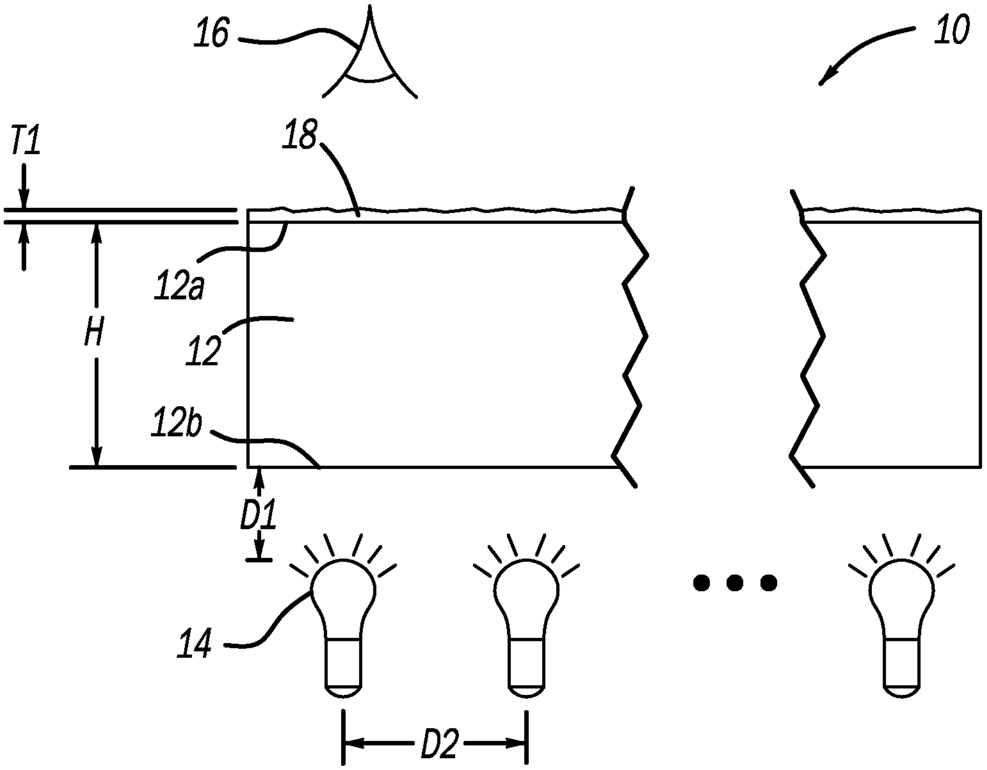
FIG. 1 is a schematic view of a lens assembly with a hardcoat applied on an outer side of the lens in accordance with an aspect of the disclosure.

With reference to FIGS. 1-4, a light assembly 10 includes a lens 12 and one or more light sources 14 (which may be in the form of LEDs). The lens 12 is spaced apart from the light source 14 at a distance D1. The lens 12 further includes a hardcoat layer 18 disposed over the surface of the lens 12 on at least one of the inner side and outer side of the lens (with the inner side being the side facing the light source 14 and the outer side being the opposite side). The material of the lens 12 may be polycarbonate, which may be susceptible to marring or damage in some instances. The hardcoat layer 18 applied to one or more sides of the lens 12 is made of a harder and more resistant material than the polycarbonate lens 12, for example, and the hardcoat layer 18 thereby provides increased protection to the lens 12.

FIG. 1 illustrates one example of the light assembly 10. The light assembly 10 is viewable in a direction pointing downward in FIG. 1, with the lens 12 being disposed between a viewer 16 and the light source 14. The distance D1 shown between the light source 14 and the lens 12 is an example and is not necessarily to scale.

FIG. 1 illustrates a light assembly 10 with the lens 12 in an untreated state. In this case, reference to untreated means that the lens 12 has not had a micro-texture applied to the lens 12 or the hardcoat 18. The hardcoat 18 is shown applied to an outer side 12*a* of the lens 12. An inner side 12*b* of the lens 12 does not includes a hardcoat 18. Depending on the distance D1 between the lens 12 and the light source 14, it is possible that sufficient diffusion may occur without applying a micro-texture. However, if the light source 14 is too close to the lens 12, light diffusion may not be sufficient, and the lens 12 may be treated with a micro-texture, as further described below.

In one aspect, the inner side 12*b* may not include a hardcoat, as such a surface is not typically exposed to the environment, and abrasive effects are unlikely to impact the inner surface 12*b* of the lens 12. The hardcoat 18, disposed on the outer side 12*a*, thereby protects the lens 12 and the light assembly 10. Depending on the distance D1 between the light source 14 and the lens 12, the hardcoat 18 without treatment or micro-texture applied, such as the example shown in FIG. 1, may provide sufficient light diffusion.

Figure 2:
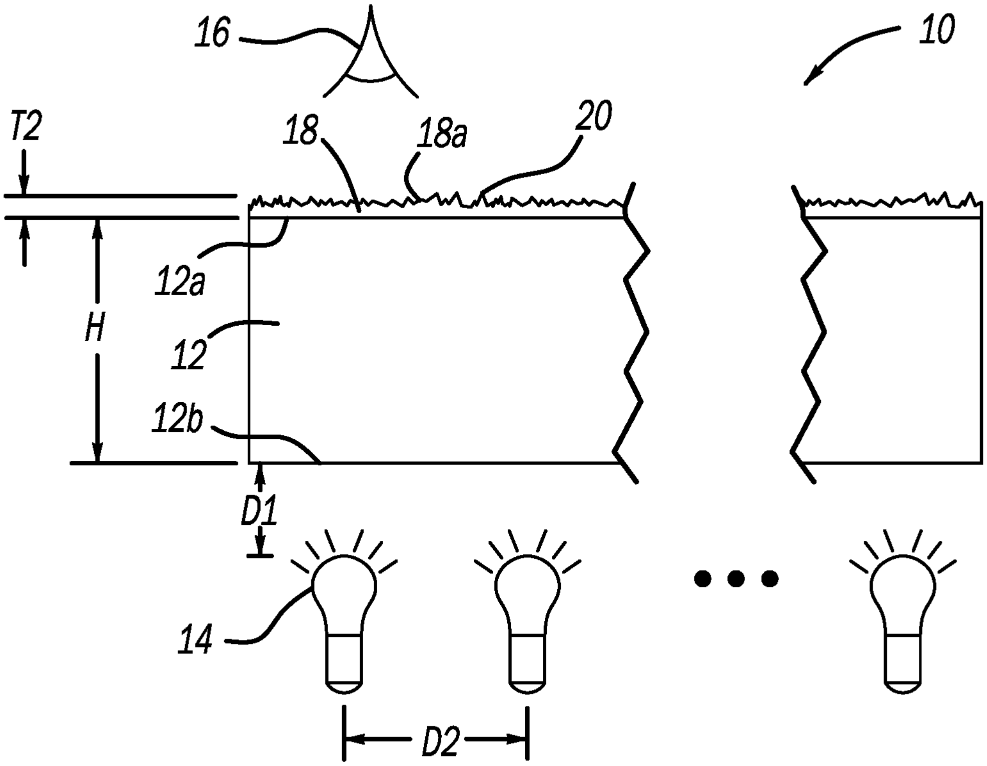
FIG. 2 is a schematic view of a lens assembly with a hardcoat applied on an outer side of the lens, and a micro-texture applied to the hardcoat, in accordance with an aspect of the disclosure.
Figure 3:
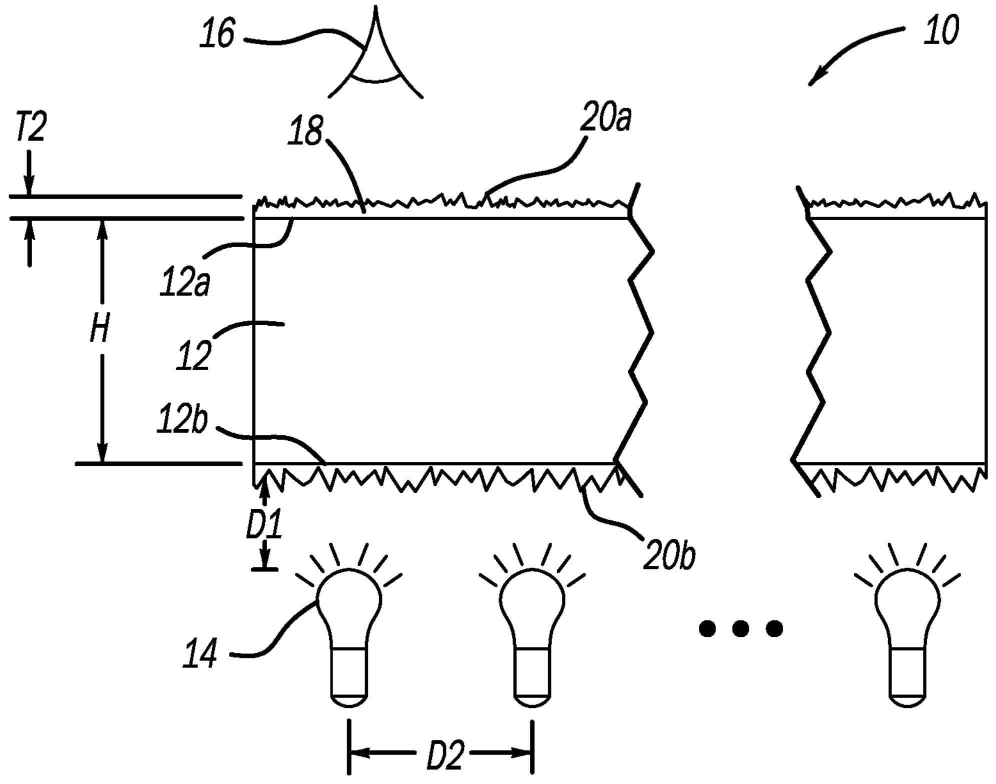
FIG. 3 is a schematic view of a lens assembly with a hardcoat applied on both an outer side and an inner side of the lens, and a micro-texture applied to both of the hardcoats, in accordance with an aspect of the disclosure, with the microtextures on opposite sides having different roughness.

The general construction of hardcoated plastic lenses 12 is shown in FIG. 1 as described above. At least one light source 14 is disposed behind an injection molded transparent or translucent lens 12. As shown in FIGS. 1-3, multiple light sources 14, such as LEDs, are present, with a spacing of D2 therebetween. Typically the lens material is polycarbonate, as described above, or an acrylic like PMMA, but nearly any light transmissive material can be used.

In one aspect, following the injection molding or other formation of the lens 12, the lens 12 is then subjected to a hardcoat treatment, resulting in the hardcoat layer 18 disposed over at least a portion of the lens body. Typically, silicone based coatings are most often used for the hardcoat layer 18. These silicone based coatings can be applied in a number of different ways including spraying, dipping, flow coating, curtaining, etc. The coatings may be cured with UV light or thermal cure. If a thermal cured coating is being used, the lens resin material must have thermal properties that will allow it to retain its shape during the curing process.

The wall stock or height H1 of the lens 12 may be about 2-5 mm (about 3 mm in one example); however, thicknesses can vary and will be dependent on the needs of the overall assembly 10, and lenses with thickness outside of the this range may also benefit from the microtextured hardcoat described herein. In one example, shown in FIG. 1, the hardcoat layer may have a thickness T1 of about 10 microns. Typical automotive specifications call for the hardcoat 18 to have a thickness of about 6-18 microns in thickness (shown for example in FIGS. 2 and 3 as thickness T2). After curing, the hardcoat 18 is generally optically clear. It will be appreciated that in the case of a microtexture being applied to the hardcoat layer 18, the texture will inherently result in different thickness due to the "peaks" and "valleys" of the microtexture.

Light distortion typically arises from defects or inclusions on the surface of the lens 12. Accordingly, minimizing these types of defects may result in higher quality optics. Light can be diffused through the lens 12 an additional amount by creating roughness or texture in the hardcoat 18.

FIG. 2 illustrates an aspect of the disclosure which includes micro-texture 20 applied to the hardcoat 18, which is disposed on the outer side of the lens 12. In one aspect, a diffusive micro-textured surface 20 is added or applied to the exposed surface of the hardcoat 18 after the hardcoat has been applied to the lens 12. The hardcoat 18, as described above, allows for minimal diffusion degradation that can be caused by the abrasive effects of dirt, sand, or other agents. The hardcoat layer 18 is also extremely useful in preventing premature yellowing and embrittlement of the underlying polycarbonate material of the lens 12 that may be caused by exposure to sunlight.

Light can be diffused through the lens 12 by creating roughness or micro-texture 20 in the hardcoat 18, such that the creation of the micro-texture 20 improves the diffusion. To create the micro-texture, the exposed surface of the hardcoat 18 can be abraded either mechanically, chemically, or using irradiation from a laser. As shown in FIG. 2, the outer exposed surface 18*a* of the hardcoat 18 is abraded, such that the micro-texture 20 is disposed on the outer exposed surface 18*a*. With the micro-texture 20 created on the hardcoat 18, the hardcoat 18 having the abraded exposed surface 18*a* may be referred to as "treated," in contrast to the untreated hardcoat 18 having a smoother exposed surface of FIG. 1.

Mechanical methods of abrasion and creation of the micro-texture 20 include, but are not limited to, sand blasting, bead blasting, or abrasive scratching. Treated/ micro-textured areas of the hardcoat 18 can have a roughness that is completely random, in one aspect. In another aspect, the roughness can have a predetermined orientation. For example, rows, grooves, dots, or the like may be provided as the micro-texture 20. Controlled abrasions may be used to create graphics, text, or other surface appearances as part of the light-diffusive effect.

In one aspect, micro-textured patterns may be produced through the use of a laser. During the creation of the micro-texture 20, material of the hardcoat layer 18 is removed or the material of the hardcoat is disrupted. Because hardcoat material is removed or disrupted, it may be desirable to apply more hardcoat material than is typically used for automotive applications, or for whichever application that the assembly 10 is intended for. For example, if the traditional thickness of the hardcoat 18 is 6-18 microns, greater than 18 microns may be initially applied to the lens 12 to define the hardcoat 18, with the applied material being removed to arrive at the typical thickness T2. Following creation of the microtexture 20 via material removal or disruption of material, randomly or controlled, the resulting thickness of the hardcoat 18 will fall within the 6-18 micron range of thickness T2 (the desired specification range). However, it is also possible to apply a coating thickness within the desired specification range (such as 6-18 microns in this example) and then remove material while remaining and ending within the specification range after the material is removed to create the micro-texture. Of course, other thicknesses for other applications could be produced in a similar manner. It will therefore be appreciated that the illustrated and described thickness T2 may have other ranges to account for various desired applications. In any event, even with the micro-texturing process that includes material removal to apply the micro-texture, the hardcoat thickness will be within the desired specification range to satisfy standards.

Thus, the micro-texture 20 may be applied to the hardcoat 18 that is applied on the outer side 12*a* of the lens 12, and the micro-texture 20 may be applied after the hardcoat 18 has been applied. Accordingly, the hardcoat 18 can provide the protection for the lens 12 from the exterior environment, with the micro-texture 20 providing for improved light diffusion. Because the micro-texture 20 is defined in the hardcoat 18 rather than on the lens 12 directly, the hardcoat 18 does not fill in or level the pores of the micro-texture 18.

With reference now to FIG. 3, another aspect of the disclosure includes creating a micro-texture 20 on both the outer side 12*a* and the inner side 12*b* of the lens 12, thereby roughening both sides of the lens 12. The process of creating the micro-texture 20 on the inner side 12*b* may be the same as for the outer side 12*a*, which was described above. In short, a hardcoat 18 may be applied to the inner side 12*b* in addition to being applied to the outer side. After applying the hardcoat 18, the micro-texture 20 may be defined in the hardcoat 18 on the exposed surface 18*a* thereof. Thus, both the inner and outer sides of the lens 12 include the protective hardcoat 18, and both sides include the diffusion improving micro-texture 20 on their exposed surfaces.

Accordingly, both single-sided and double-sided texturing and strengthening of the lens 12 may be provided on the lens 12. In the case of a single-sided treatment, in which both the hardcoat 18 and micro-texture 20 are present, the opposite side may include no treatment, as in FIG. 2, or another type of finish. For example, the non-treated side may include a hardcoat but no micro-texture is formed on the exposed surface of the hardcoat; or, the "non-treated" side may include a micro-texture formed directly on the lens material (such as polycarbonate) but without a hardcoat. However, in such cases, the lack of a hardcoat may result in degradation of the micro-texture, or the lack of a micro-texture may not provide enhanced diffusion.

According to an aspect, the outer side 12*a* of the lens 12 may include the disclosed hardcoat 18 and micro-texture 20 treatment, with the inner surface 12*b* optionally including the additional hardcoat 18 and/or micro-texture 20. The outer side 12*a* of the lens 12 is the side that is typically exposed to the elements in automotive applications, and thereby typically benefits more from the hardcoat 18 than the inner side 12*b*. However, in another aspect and for other applications, the inner surface 12*b* may include the hardcoat 18 and micro-texture 20, with the outer surface 12*a* being untreated. Thus, it will be appreciated that the reference to the inner side and outer side with respect to hardcoat and micro-texture application may also be interpreted as a first side and second side.

The roughening treatments that define the micro-texture 20 can be applied to substantially the entire surface of the lens 12 and the hardcoat layer 18 applied thereto. Reference to the entire surface refers to substantially the entire outer side 12*a* or inner side 12*b*, or whichever surface is being treated. In another aspect, either selective or targeted roughening to define the micro-texture 20 may be used, such that certain areas or regions of the lens 12 and hardcoat 18, or a surface thereof, have the micro-texture 20, with other portions of the lens 12 and hardcoat 18 being free from the micro-texture 20. Put another way, the as-applied exposed surface of the hardcoat 18 is not roughened in these areas. It will be appreciated that the exposed surface of the hardcoat 18 has an inherent texture and roughness, and that the reference to the micro-texture 20 is to the texture defined by the roughening processes described herein.

Figure 4:
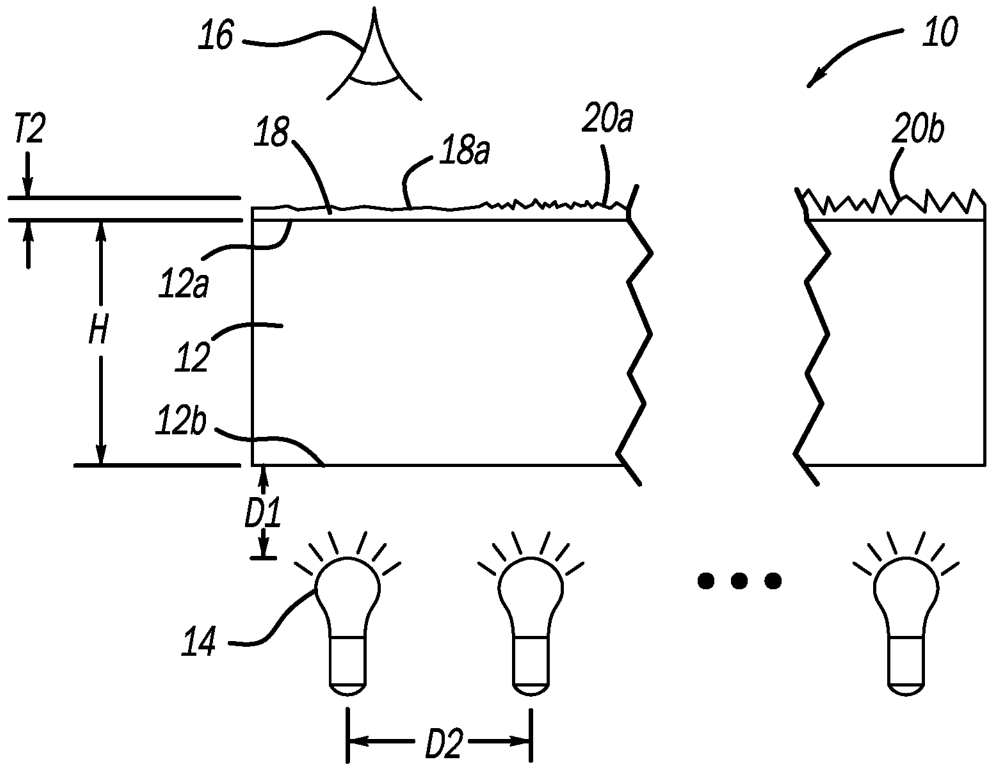
FIG. 4 is a schematic view of a lens assembly with a hardcoat applied to at least one side of the lens with the exposed surface, with the micro-texture having different surface roughness levels.

In one aspect, the hardcoat 18 may have a first roughness and the micro-texture 20 may have a second roughness. The first roughness of the hardcoat 18 may be smoother than the second roughness of the micro-texture 20. The micro-texture 20 may have different roughness in different regions of the hardcoat 18, thereby creating more than two different levels of roughness. For example, a third, fourth, fifth, etc. roughness may be defined by the roughening process applied to select regions of the hardcoat 18. FIG. 4 illustrates varying roughness, including the non-microtextured hardcoat layer 18, and two different roughness levels 20*a* and 20*b* of micro-texture applied to the hardcoat layer 18. The roughness 20*b* on the right side of the hardcoat 18 is higher than the roughness 20*a* in the middle, for example.

In one aspect, the opposite sides 12*a* and 12*b* of the lens 12 on which the microtexture 20 may be applied can be fully covered by the hardcoat 18, or may be coated in select areas or regions where the micro-texture 20 will be applied. However, in such cases of partial hardcoating, the non-hardcoated regions would be susceptible to the elements similar to non-coated surfaces described above. However, this may be acceptable depending on the intended environment of the lens 12.

In one aspect, the lens 12 can be roughened completely with the micro-texture 20, or substantially completely, on the outer side 12*a* (which may also be referred to as a first side or first surface) but in selected areas or regions on the inner side 12*b* (which may also be referred to as a second side or second surface), and vice versa. It will be appreciated that various partial coating/texturing may be applied to any surface or side of the lens 12 depending on the specific intended environment and desired light diffusion aspects for the ultimate product or component.

In yet another aspect, additional treatments can be applied to the lens 12, and the sides 12*a* and/or 12*b* thereof, such as adding a dye to the treated side 12*a* in order to create a colored aesthetic. For example, the material of the hardcoat 18 may be dyed, and then roughened to define the micro-texture 20, such that the microtexture 20 and the hardcoat 18 are both colored.

In one aspect, multiple processes may be used in conjunction with each other to define the micro-texture 20. For example, processes such as abrasive scratch and bead blast may both be used in order to achieve a unique aesthetic appearance relative to using only a single roughening process. For example, if only bead blast is used, the appearance will be different relative to a process where bead blast is used followed by abrasive scratch.

In one aspect, one type of process (for example, abrasive scratch) may be used on one of the sides 12*a* or 12*b*, and another type of process (for example, bead blast) may be used on the opposite side 12 or 12*b* in order to achieve unique appearances in certain locations. Similarly, a combination of processes may be used on side 12*a*, with a different combination, or a single process, used on side 12*b*, or vice versa. Thus, the outer side 12*a* may have an aesthetic appearance as a result of the selected process or combination of processes, and inner side 12*b* may have a different aesthetic appearance as a result of a different selected process or combination of processes. For example, FIG. 3 illustrates a different roughness level (20*a* or 20*b*) on opposite sides of the lens 12. However, the roughness on both sides may also be the same.

The various options for each of the sides 12*a* and 12*b* described herein may be combined with each other to further vary the appearance and/or roughness of the sides 12*a* and 12*b*. For example, different dyes and/or selected regions and/or different roughening processes may be used on side 12*a* relative to side 12*b*.

As used throughout the specification, various sides and surfaces have been referred to. It will be appreciated that due to the selective stack-up and application of various material layers, that a particular material may define an exposed surface in one area but be covered in other areas. Reference to "side" or "surface" shall be interpreted as being limiting, as a particular side of a material may also be the outermost or exposed surface of the component.

Obviously, many modifications and variations of the present disclosure are possible in light of the above teachings and may be practiced otherwise than as specifically described while within the scope of the appended claims. These antecedent recitations should be interpreted to cover any combination in which the inventive novelty exercises its utility.

The invention claimed is:

1. A light assembly for an automotive vehicle, the light assembly comprising:
- a light source;
- a lens disposed adjacent the light source at a predetermined distance from the light source, wherein the lens includes an inner side facing the light source and an outer side facing away from the light source;
- a hardcoat layer applied to at least one of the inner side and the outer side;
- a micro-texture defined in at least a portion of the hardcoat layer;
- wherein the micro-texture increases diffusion of light provided by the light source.

2. The light assembly of claim 1, wherein the hardcoat layer has a first roughness, and wherein the micro-texture has a second roughness that is different than the first roughness.

3. The light assembly of claim 2, wherein the first roughness is smoother than the second roughness.

4. The light assembly of claim 1, wherein the hardcoat layer is disposed on the outer side of the lens, and the microtexture is defined in an exposed surface of the hardcoat layer facing away from the lens and the light source.

5. The light assembly of claim 4, wherein a second hardcoat layer is disposed on the inner side of the lens, and a second microtexture is defined in an exposed surface of the second hardcoat layer facing away from the lens and toward the light source.

6. The light assembly of claim 1, wherein the microtexture is defined by removal of material or disruption of material of the hardcoat layer, wherein the hardcoat layer is applied to the lens prior to defining the microtexture.

7. The light assembly of claim 1, wherein the microtexture is disposed across substantially an entire exposed surface of the hardcoat layer.

8. The light assembly of claim 1, wherein the microtexture is disposed across select regions of the hardcoat layer, with other select regions being free from the microtexture.

9. The light assembly of claim 1, wherein the hardcoat layer is made from a material that is harder than the material of the lens.

10. The light assembly of claim 1, wherein the hardcoat layer and microtexture are disposed on both the inner and outer sides of the lens, wherein the microtexture on the inner side has a different roughness than the microtexture on the outer side.

11. The light assembly of claim 10, wherein the micro-textures on the inner side and the outer side are defined via different roughening processes.

12. A light assembly for an automotive vehicle, the light assembly comprising:
- at least one LED;
- a lens disposed adjacent the at least one LED at a first distance, wherein the lens includes a first side facing away from the light source and an second side facing the light source;
- a hardcoat layer applied to at least a portion of first side and/or the second side;
- a micro-texture defined in at least a portion of an exposed surface of the hardcoat layer;
- wherein the micro-texture increases diffusion of light provided by the at least one LED.

13. The light assembly of claim 12, wherein the at least one LED comprises a plurality of LEDs spaced apart at a second distance.

14. The light assembly of claim 13, wherein the first distance between the lens and the plurality of LEDs is less than 1.1 times the second distance.

15. The light assembly of claim 13, wherein the hardcoat layer is about 6-18 microns in thickness and the lens is about 2-5 mm in thickness.

16. The light assembly of claim 13, wherein the microtexture is disposed across the lens randomly or in a predefined pattern.

17. A method of treating a lens of a light assembly for a vehicle, the method comprising:

providing a lens at a first distance from a light source;

applying a hardcoat layer to at least one side of the lens; and roughening the hardcoat layer and defining a microtexture in an exposed surface of the hardcoat layer after the hardcoat layer has been applied to the lens.

18. The method of claim 17, wherein the hardcoat layer and microtexture are applied to both sides of the lens.

19. The method of claim 17, wherein the microtexture is applied to select regions of the lens.

20. The method of claim 17, wherein the microtexture is applied via removal or disruption of material of the hardcoat layer, wherein a first thickness of the hardcoat layer is applied and material is removed from the first thickness, thereby defining a second thickness of the hardcoat layer and the microtexture, wherein the second thickness falls within a predefined specification range.

21. The method of claim 20, wherein the predefined specification range is 6-18 microns.

22. The method of claim 21, wherein the first thickness of the hardcoat layer also falls within the predefined specification range.

* * * * *